United States Patent
Motos et al.

(10) Patent No.: US 11,366,216 B2
(45) Date of Patent: Jun. 21, 2022

(54) COMBINED PHASE AND TIME-OF-FLIGHT MEASUREMENT

(71) Applicant: TEXAS INSTRUMENTS INCORPORATED, Dallas, TX (US)

(72) Inventors: Tomas Motos, Hamar (NO); Espen Wium, Oslo (NO)

(73) Assignee: Texas Instruments Incorporated, Dallas, TX (US)

( * ) Notice: Subject to any disclaimer, the term of this patent is extended or adjusted under 35 U.S.C. 154(b) by 126 days.

(21) Appl. No.: 16/680,714

(22) Filed: Nov. 12, 2019

(65) Prior Publication Data

US 2020/0158853 A1    May 21, 2020

Related U.S. Application Data

(60) Provisional application No. 62/767,971, filed on Nov. 15, 2018.

(51) Int. Cl.
*G01S 13/84* (2006.01)
*B60R 25/24* (2013.01)

(52) U.S. Cl.
CPC .............. *G01S 13/84* (2013.01); *B60R 25/245* (2013.01)

(58) Field of Classification Search
CPC combination set(s) only.
See application file for complete search history.

(56) References Cited

U.S. PATENT DOCUMENTS

| 5,912,644 A * | 6/1999 | Wang | G01S 5/14 342/457 |
|---|---|---|---|
| 2011/0292982 A1* | 12/2011 | Chen | G01S 5/14 375/224 |
| 2014/0074732 A1* | 3/2014 | Den Herder | G06Q 10/10 705/306 |
| 2017/0272906 A1* | 9/2017 | Kerai | H04W 12/06 |

OTHER PUBLICATIONS

Mohiuddin et al, "a Technique for Determining Carrier Phase Differences Between Independent GPS Receivers During Scintillation", Sep. 25-28, 2007, ION GNSS 20th International Technical Meeting of the Satellite Division, Fort Worth, Texas. (Year: 2007).*

* cited by examiner

*Primary Examiner* — Nabil H Syed
*Assistant Examiner* — Cal J Eustaquio
(74) *Attorney, Agent, or Firm* — Brian D Graham; Charles A. Brill; Frank D. Cimino

(57) ABSTRACT

Systems and methods of measuring distance between two wireless devices by combining phase shift and time-of-flight measurements. A first wireless devices sends a first packet to the second wireless device. After receiving the first packet, the second wireless device sending to the first wireless device a second packet. After sending the second packet, the second wireless device sends a first continuous wave signal to the first wireless device. After receiving the first continuous wave signal, the first wireless device sends to the second wireless device a second continuous wave signal. The first wireless device then calculates a time-of-flight measurement based on a time between the first wireless device sending the first packet and receiving the second packet, and calculates a second measurement based on a phase shift of the first continuous wave signal and the second continuous wave signal, and combines the two measurements.

20 Claims, 7 Drawing Sheets

US 11,366,216 B2

COMBINED PHASE AND TIME-OF-FLIGHT MEASUREMENT

This application claims priority to U.S. Provisional Application No. 62/767,971 filed on Nov. 15, 2018, which is incorporated by reference herein.

BACKGROUND

In some applications it may be necessary to measure the distance to a wireless device or between two wireless devices. For example, an automobile may measure the distance between it and a key fob that is attempting to access the automobile to confirm the proximity of the keyfob before granting access rights. One such example is a passive keyless entry system. In order to maximize the accuracy of the estimations, however, multiple measurements on multiple frequencies may be required, which may require a substantial amount of time and power. Many wireless devices, for example battery powered devices (e.g., key-fobs), however, may not have the power necessary for the multiple measurements to obtain the desired accuracy.

BRIEF DESCRIPTION OF THE DRAWINGS

For a detailed description of various examples, reference will now be made to the accompanying drawings in which.

SUMMARY

Figure 1:
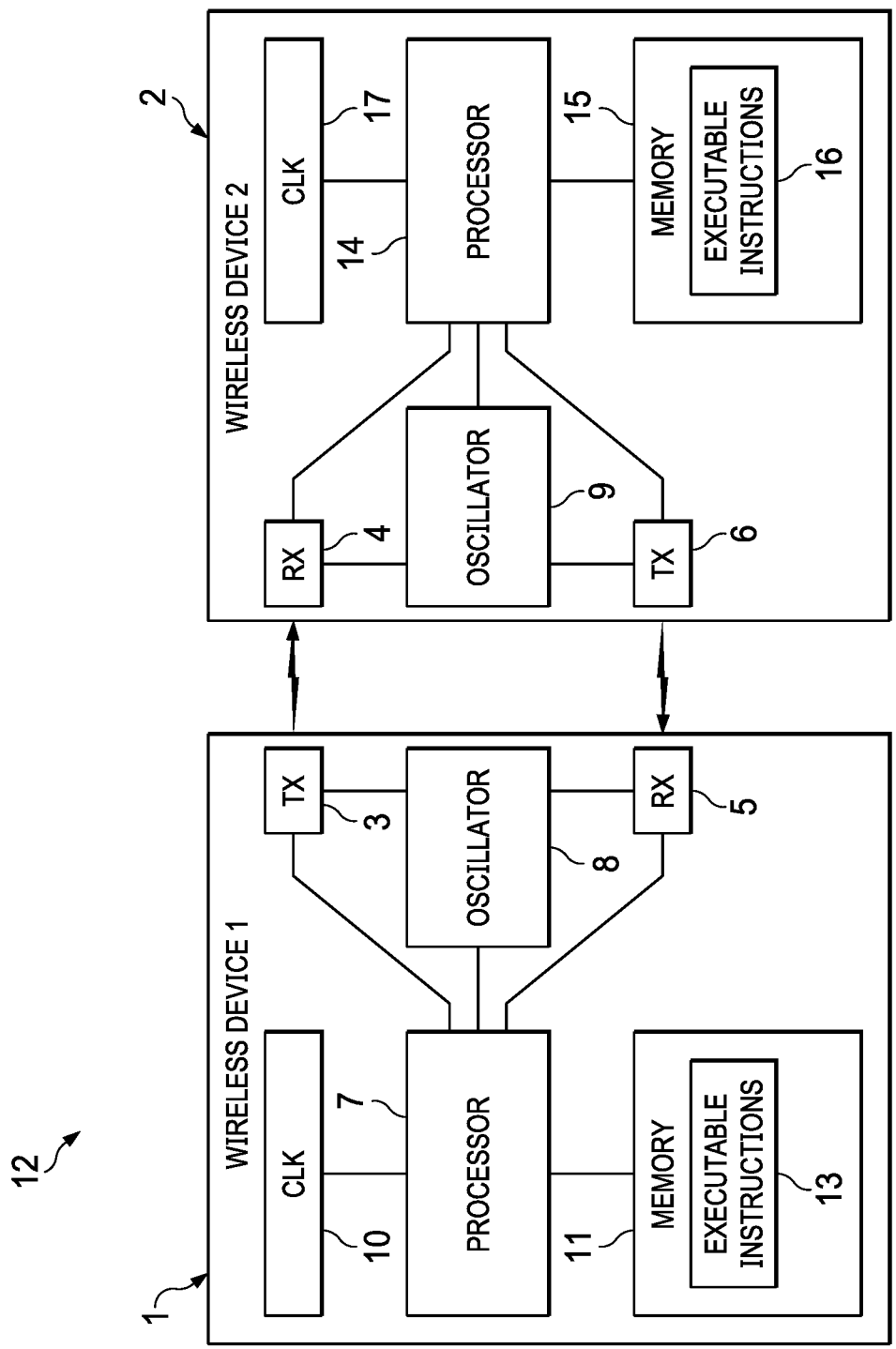
FIG. 1 shows an illustrative wireless system for performing the distance measurement methods described herein.

Illustrative methods described herein include a method for measuring a distance between a first wireless device and a second wireless device. The method includes sending a first packet from the first wireless device to the second wireless device and receiving, by the first wireless device, a second packet from the second wireless device. The method also includes receiving, by the first wireless device, a first continuous wave signal from the second wireless device, and sending, by the first wireless device, a second continuous wave signal to the second wireless device. The method further includes calculating a first measurement of the distance based on a time between the first wireless device sending the first packet and receiving the second packet, and calculating a second measurement of the distance based on a phase shift of the first continuous wave signal and the second continuous wave signal. The method also includes determining the distance based on the first measurement and the second measurement.

Another illustrative method described herein includes a method for measuring a distance to a wireless device. The method includes sending a first packet to the wireless device and, after the first packet is sent, receiving a second packet from the wireless device. The method also includes, after receiving the second packet, receiving a first continuous wave signal from the wireless device, and, after receiving the first continuous wave signal, sending a second continuous wave signal to the wireless device. The method then includes calculating a first measurement of the distance based on a time between sending the first packet and receiving the second packet and calculating a second measurement of the distance based on a phase shift of the first continuous wave signal and the second continuous wave signal. The method further includes determining the distance based on the first measurement and the second measurement.

Illustrative systems described herein include a system for measuring a value indicative of distance. The system includes a first wireless device configured to send a first packet, and a second wireless device configured to receive the first packet and then to send to the first wireless device a second packet and then a first continuous wave signal. The first wireless device is further configured, upon receiving the first continuous wave signal, to send to the second wireless device a second continuous wave signal. The first wireless device is further configured to calculate a first measurement based on a time difference between sending of the first packet and receiving the second packet, to calculate a second measurement based on a phase shift of the first continuous wave signal and the second continuous wave signal, and to determine a distance between the first wireless device and the second wireless device based on the first measurement and the second measurement.

DETAILED DESCRIPTION

Illustrative methods and systems described herein measure distance between wireless devices with increased accuracy and lower power requirements. Because the illustrative systems and methods can achieve a desired accuracy with reduced power, they may, for example, be particularly suited for use with battery powered wireless devices (e.g., keyfobs).

FIG. 1 shows illustrative wireless communications system 12 having illustrative wireless communications devices 1 and 2 that are configured to perform the illustrative reduced-power distance measurements described herein. Wireless device 1 includes transmitter 3 and receiver 5 and wireless device 2 includes transmitter 6 and receiver 4. Transmitters 3 and 6 may be, for example, radio frequency (RF) transmitters. Receivers 5 and 6 may be, for example, RF receivers. Wireless devices 1 and 2 each have an oscillator 8 and 9, respectively, for generating RF signals. Oscillators 8 and 9 may be, for example, phase-locked loops (PLLs) capable of generating sine waves. Wireless device 1 may also include a processor 7, a memory 11 and a clock 10. Wireless device 2 may also include a processor 14, a memory 15 and a clock 17. Processors 7 and 14 may be configured, for example, to perform the distance measurement calculations described herein. Memories 11 and 15 include executable instructions 13 and 16, respectively, and may comprise a non-transitory storage device such as volatile memory (e.g., random access memory) or non-volatile memory (e.g., read only memory). Wireless device 1 may be, for example, a master device, and wireless device 2 may be, for example, a slave device. Wireless device 2 may be, for example, a keyfob and wireless device 1 may be incorporated into a vehicle (e.g., automobile, truck, etc.). It may be desirable for the wireless device 1 to determine, for example, a distance to wireless device 2 to determine if wireless device 2 is close enough to grant access permission. If wireless device 1 is incorporated into a vehicle, wireless device 1 may permit the doors to be unlocked and/or the motor to be engaged upon determining that the wireless device 2 is sufficiently close to wireless device 1.

One technique for measuring distance between wireless devices (e.g., wireless communications devices 1 and 2) is a time-of-flight measurement. The time-of-flight measurement is based on the time that elapses between sending a packet to and receiving a packet from a wireless device. In a time-of-flight measurement, wireless device 1 sends a packet, for example a PING packet, to wireless device 2, which responds with another packet, for example an ACK packet. The packets may be, for example, synchronization word packets. A synchronization word packet is a packet that may include a random or pseudo-random bit sequence that is known to wireless device 1 and wireless device 2. Various methods may be used by the devices to generate this sequence, such as linear feedback shift registers (LFSR) or cryptographic generation algorithms such as AES. Alternatively, wireless device 1 may send the sequence to wireless device 2, or vice versa. A synchronization word packet may have auto-correlation properties that increase the likelihood of packet detection in the presence of noise.

The initiator of the time-of-flight measurement, in this example wireless device 1, may use clock 10 to determine the time between sending the PING packet and receiving the ACK packet. In this regard, processor 7 may count ticks or counts of clock 10, and may convert the ticks or counts to time. For example, processor 7 may begin counting the number of ticks of clock 10 when the PING packet is sent and may stop counting the ticks when the ACK packet is received. While the time between sending the PING packet and receiving the ACK packet may include the time that wireless device 2 takes to receive and send the ACK signal, the time should at least be proportional to the over-the-air roundtrip time and therefore representative of the distance between wireless device 1 and wireless device 2. The processor 7 may convert the calculated time to distance based on, for example, the known properties of wireless devices 1 and 2 (e.g., over-the-air speed of the RF signal and propagation delays).

Because times-of-flight for short distances may be relatively small (e.g., in the range of a few nanoseconds), the measurements may be impacted by any error. It may, therefore, be helpful to repeat these measurements multiple times to increase the accuracy of the results. Similarly, due to dynamic multipath propagation conditions, channel interference (such as collisions with other wireless standards), and efforts to reduce the impact of these issues, the measurements may be subject to variation. Thus, it may be desirable to repeat these measurements on a number of different channels to increase the accuracy. Such repeated measurements, however, may cause a power burden for wireless devices, particularly for battery-powered wireless devices.

Another technique for measuring distance involves measuring the phase shift of incoming signals. In an exemplary implementation of this technique, processor 7 of wireless device 1 instructs oscillator 8 to generate a continuous wave signal (CW), which may be an unmodulated RF carrier signal. Transmitter 3 of wireless device 1 receives the CW from oscillator 8 and sends the CW to wireless device 2. Receiver 4 of wireless device 2 detects the CW and measures the frequency of the CW and the phase of the CW with respect to a local phase of oscillator 9, which receiver 4 received from oscillator 9. Receiver 4 then provides the measured values to processor 14. Processor 14 then instructs oscillator 9 to generate a CW with the same frequency and phase as the CW received from wireless device 1, and that CW is then sent to wireless device 1. Wireless device 2 then sends local phase information to wireless device 1 by any known method (e.g., Bluetooth, WiFi, wired connection, etc.). Using its own local phase information and the local phase information received from wireless device 2, wireless device 1 then uses processor 7 to calculate the phase shift of a received CW, which will be the same for both CWs in the exchange.

As stated above, a CW sent from wireless device 1 to wireless device 2 will have its local phase shifted or rotated by the same amount as a CW traveling from wireless device 2 to wireless device 1. Receiver 5 of wireless device 1 measures the phase of the incoming CW with respect to the local phase of the oscillator 8. Similarly, receiver 4 of wireless device 2 measures the phase of the incoming CW with respect to the local phase of the oscillator 9. The relationship of the measured phases and of the incoming CWs to both local oscillator phases and and the phase shift between devices may be defined as follows:

$$\phi_1 = \psi_2 + \theta - \psi_1$$

$$\phi_2 = \psi_1 + \theta - \psi_2$$

where $\phi_1$ and $\phi_2$ are the phases of the incoming CWs measured at wireless devices 1 and 2, respectively, $\theta$ is phase shift as the CW travels between devices and $\psi_1$ and $\psi_2$ are the local phases of oscillators 8 and 9, respectively. After wireless device 2 sends the measured $\phi_2$ to wireless device 1, wireless device 1 can calculate the phase shift $\theta$ by using the following equation, which is a combination of the two above equations:

$$\theta = \frac{\Phi_1 + \Phi_2}{2}$$

The phase shift or rotation of the RF signal as it travels between the devices is proportional to the distance between the devices. The phase shift $\theta$ of a CW between wireless device 1 and wireless device 2 may also be expressed as:

$$\theta = \frac{2\pi f r}{c} \mod 2\pi$$

where c is the speed of light, f is the frequency of the CW and r is the distance between the devices. Using this equation, the distance between the devices can be expressed as:

$$r = \frac{c\theta}{2\pi f} \mod \frac{c}{f}$$

Due to the spatial periodicity of the RF signals, a single phase shift measurement at a single frequency may be able to determine a precise distance once an approximate distance is known. However, because some techniques are unable to distinguish between phase shifts that are separated by multiples of half the CW period, a single measurement may yield multiple possible locations, each separated by a half wavelength of the CW. If the RF carrier signal is, for example, in the 2.4 GHz industrial, scientific and medical (ISM) band and the distance is considered in bins of about 6 cm, a single measurement may determine where the distance falls within a bin but be unable to determine which bin the distance falls in. Multiple measurements in multiple frequencies may be necessary to compensate for these issues, thereby requiring more power to calculate distance with a desired accuracy. Where two different CW exchanges are performed using different two different frequencies, the distance may be calculated using the following equation:

$$r = \frac{c\Delta\theta}{2\pi\Delta f} \bmod \frac{c}{\Delta f}$$

where $\Delta\theta$ is the difference in the two measured phase shifts for CWs in two different CW exchanges and $\Delta f$ is the difference between the frequencies. Thus, the bin size increases, and with a $\Delta f$ of approximately 1 MHz, the distance r may be able to be determined within a bin of around 300 meters. Thus, two measurements provide increased range compared to a single measurement, but even these two measurements may not provide sufficient accuracy as they are still subject to the inherent inaccuracies of phase shift measurements.

Illustrative methods and systems described below and in the figures provide measurements with increased accuracy and/or range by combining phase shift and time-of-flight measurements in ways that provide increased accuracy, range and/or flexibility. Combining phase and time-of-flight measurements provides an improved measurement because one measurement protocol may compensate for the deficiencies of the other. For example, phase shift measurements are less vulnerable to device or propagation variations than are time-of-flight measurements. In contrast, phase shift measurements, unlike time-of-flight measurements, are subject to periodicity and may be reliant on precise oscillators that may be impacted by noise or drift.

Figure 2:
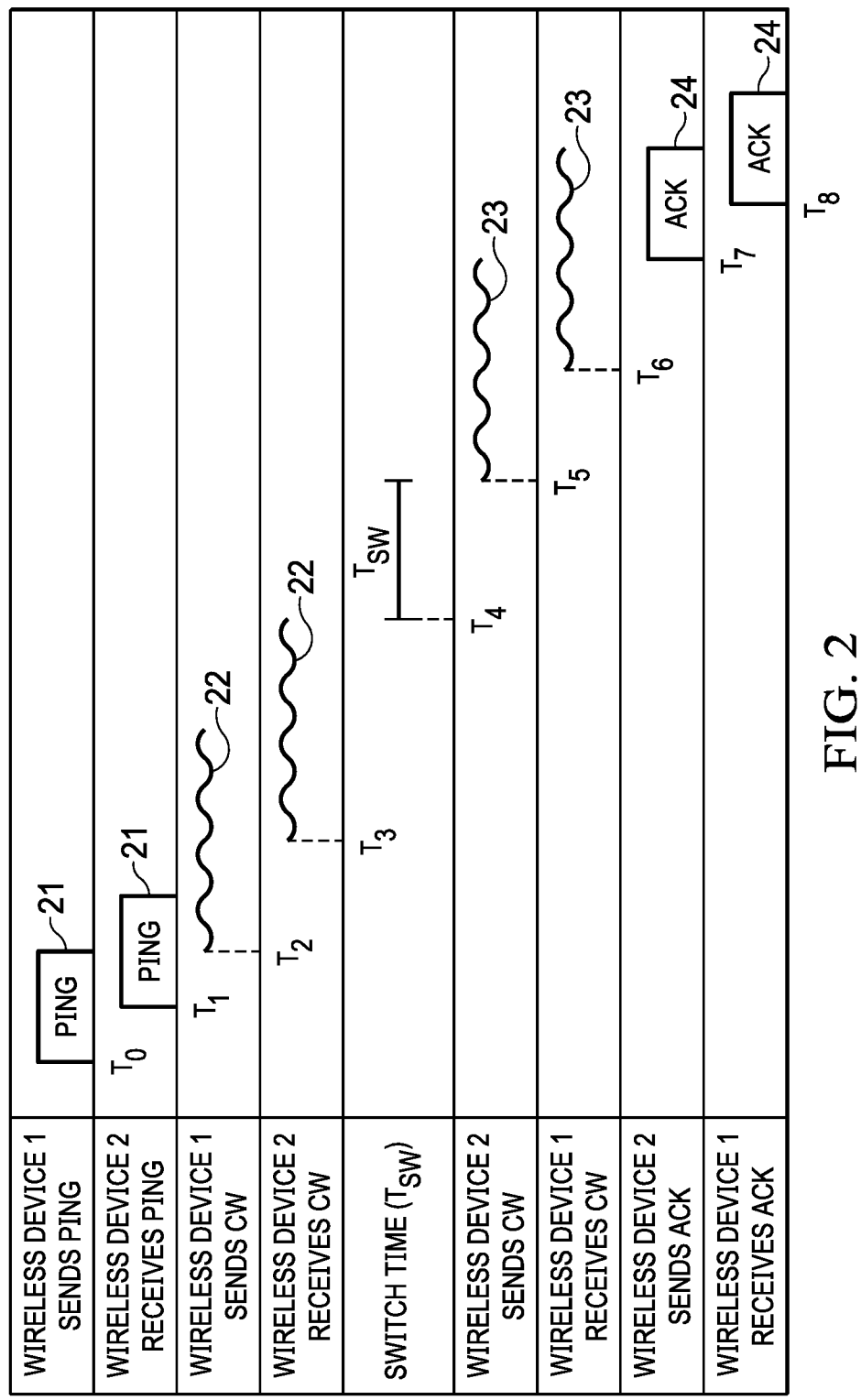
FIG. 2 shows a timing diagram for an illustrative distance measurement protocol.

FIG. 2 shows a timing diagram for an illustrative distance measuring protocol that combines the time-of-flight and phase shift protocols described above, and FIG. 3 shows the steps for performing the measurement protocol. In step 30, wireless devices 1 and 2 may lock the outputs of oscillators 8 and 9, respectively to a desired common frequency. In step 31, wireless device 1 generates a PING packet 21 and at $T_0$ transmitter 3 sends the PING packet 21 to wireless device 2. PING packet 21 may be, for example, a synchronization word packet. Processor 7 may begin counting ticks from clock 10 at, for example, time $T_0$. Receiver 4 of wireless device 2 begins to receive the PING packet 21 at $T_1$. Step 31 may alternatively occur before step 30, but step 30 should be timed to allow sufficient time for the oscillators to settle in to the desired frequency before sending a CW. In step 32, processor 7 of wireless device 1 instructs oscillator 8 to generate CW 22, and at $T_2$ transmitter 3 sends CW 22, which receiver 4 of wireless device 2 begins receiving at $T_3$. Although the receiver 4 is shown receiving the PING packet 21 (at time $T_1$) before the transmitter 3 sends the CW 22 (at time $T_2$), depending on the distance between the transmitter 3 and the receiver 4, time $T_1$ may occur well after time $T_2$ in other examples.

In step 33, at $T_4$ wireless device 1 switches from transmitter mode to receiver mode, and wireless device 2 switches from receiver mode to transmitter mode, during which a switch time $T_{sw}$ elapses. Switching between transmitter and receiver modes may involve powering down a power amplifier in transmitter 3 used to produce the CW and power up a low noise amplifier in receiver 4 used to receive the CW, and vice versa. The switching may also involve enabling and disabling of transmitter and receiver logic, while also maintaining the oscillator locked at the desired frequency. Thus, switching may be time consuming and power intensive. In step 34, receiver 4 measures the frequency and phase of CW 22 with respect the local phase of oscillator 9 and provides these measurements to processor 14. Processor 14 then instructs oscillator 9 to generate CW 23 based on the measured frequency and phase of CW 22. At $T_5$ transmitter 6 of wireless device 2 sends CW 23 to receiver 5 of wireless device 1, which begins receiving CW 23 at $T_6$.

In step 35, processor 14 of wireless device 2 generates an acknowledgment (ACK) packet 24, which may be a synchronization word packet. At $T_7$ transmitter 6 sends ACK packet 24 to receiver 5 of wireless device 1, which receives ACK packet 24 at $T_8$ causing processor 7 to stop counting the ticks of clock 10. Although the receiver 5 is shown receiving the CW 23 (at time $T_6$) before the transmitter 6 sends the ACK packet 24 (at time $T_7$), depending on the distance between the transmitter 6 and the receiver 5, time $T_6$ may occur well after time $T_7$ in other examples.

Processor 7 may store the number of counted ticks that represent the time-of-flight measurement in memory 11. In step 36, wireless device 2 sends the measured phase $\phi_2$ of CW 22 to wireless device 1 by any known method (e.g., Bluetooth, WiFi, wired connection, etc.). In step 37, processor 7 of wireless device 1 calculates the phase shift $\theta$ using the measured phase $\phi_1$ of CW 23 and the measured phase $\phi_2$ of CW 22 received from wireless device 2, and may convert the recorded tick count to time. One or both of the phase shift and tick count (or time) may be converted to a distance measurement. In step 38, processor 7 combines the phase shift measurement and the time-of-flight measurement calculated in step 37 by, for example, calculating an average or weighted average of the measurements depending on which of time-of-flight or phase shift should be accorded more weight. The measurements may also be compared and the discarded if not within a chosen range and/or of the same order of magnitude.

Figure 3:
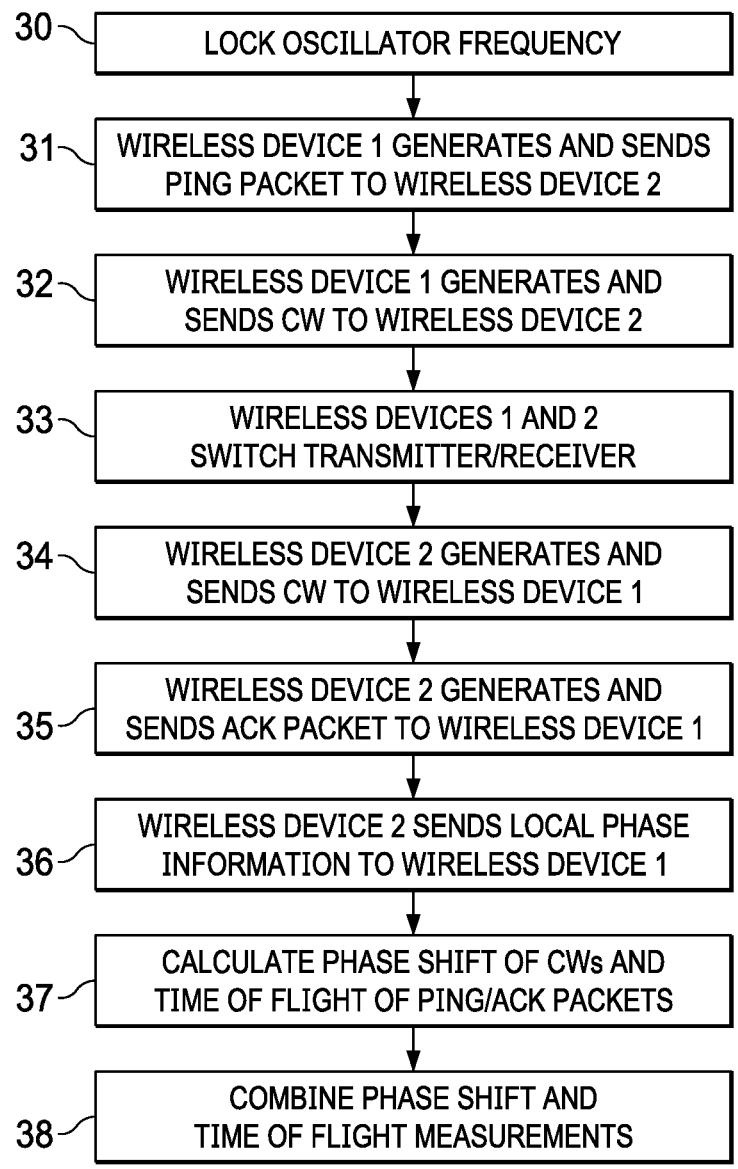
FIG. 3 shows an illustrative method for performing the distance measurement protocol of FIG. 2.

The measurement protocol described in FIGS. 2 and 3 increases accuracy and energy efficiency of measurements by combining phase and time-of-flight measurements to reduce the number of receiver/transmitter switches. The protocol described in FIGS. 2 and 3, however, need not be performed as many times as either time-of-flight or phase difference alone for the same accuracy level, and therefore may achieve the same, or better, level of accuracy with the same or fewer number of measurements. Because wireless device 2 device reads and generates the CWs "back-to-back"—i.e., generates its own CW after receiving and reading the CW from the wireless device 1 without any packet exchange in between, the oscillator 9 of the wireless device 2 may remain locked during the role switch, thereby eliminating the need to restart the oscillator and lock into a frequency, reducing time and power consumption. In addition, because the devices send the time-of-flight packet and CWs "back-to-back," a switch time may be avoided between signing those signals. The steps of FIG. 3 may be performed multiple times, and the results averaged, to increase the accuracy.

Figure 4:
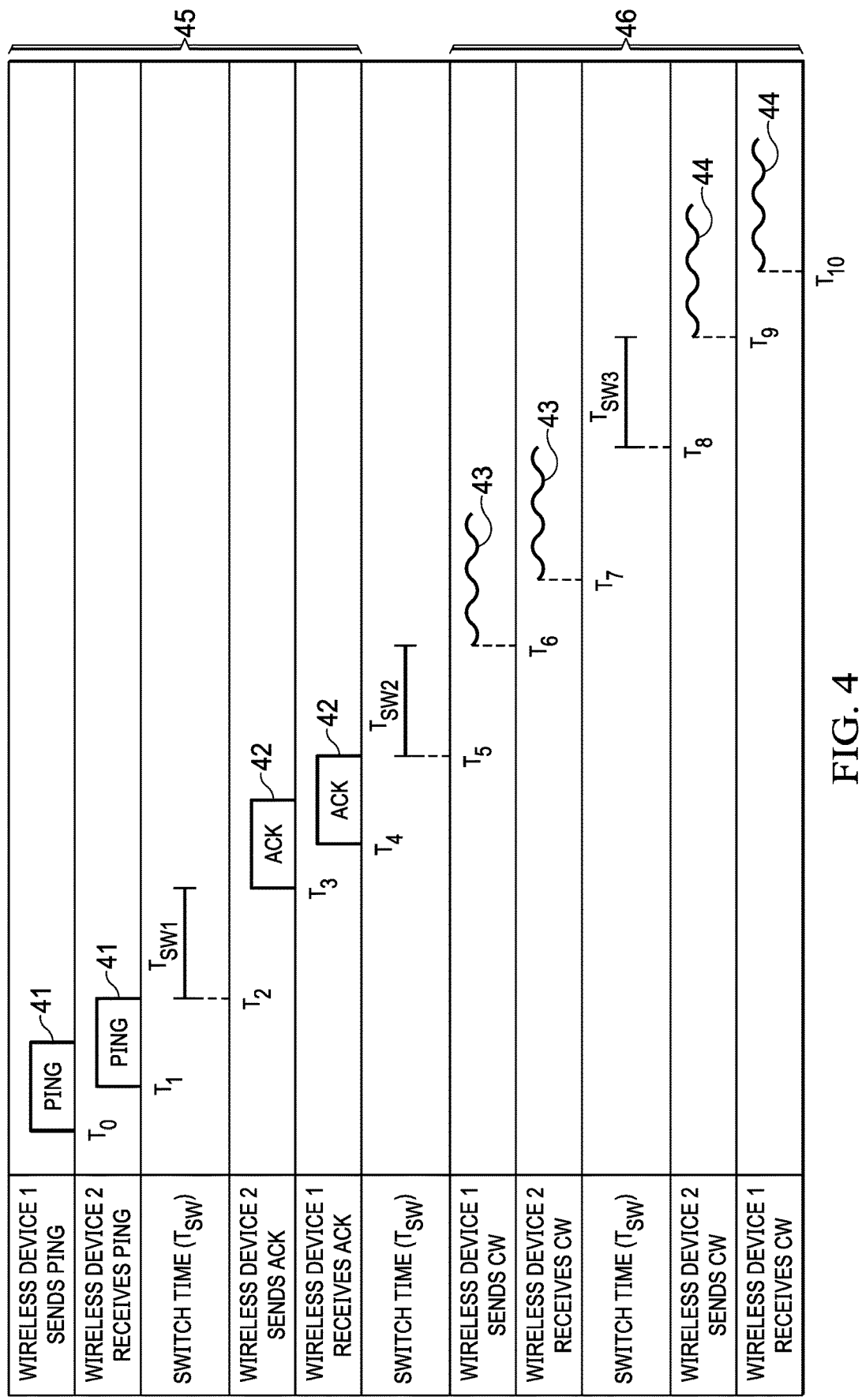
FIG. 4 shows a timing diagram for an illustrative distance measurement protocol.

FIG. 4 shows a timing diagram for another illustrative distance measuring protocol that combines the time-of-flight and phase shift measurements described above, and FIG. 5 shows the steps for performing the measurement protocol. In step 50, wireless devices 1 and 2 may lock the outputs of oscillators 8 and 9, respectively to a desired common frequency. In step 51, wireless device 1 generates a PING packet 41 and at $T_0$ transmitter 3 sends PING packet 41 to wireless device 2. Processor 7 may begin counting ticks from clock 10 at, for example, time $T_0$, and receiver 4 of wireless device 2 begins receiving the PING packet 41 at $T_1$. PING packet 41 may be, for example, a synchronization word packet. Step 50 may alternatively be performed at any point before step 55 below, and should be timed to allow sufficient time for the oscillators to settle in to the desired frequency before sending a CW. In step 52, at $T_2$ wireless devices 1 switches from transmitter mode to receiver mode, and wireless device 2 switches from receiver mode to transmitter mode, during which a first switch time $T_{sw1}$ elapses. In step 53, processor 14 of wireless device 2 generates an ACK packet 42, which may be a synchronization word packet. At $T_3$ transmitter 6 sends the ACK packet 42 to receiver 5 of wireless device 1, which receives the ACK packet 42 at $T_4$ causing processor 7 to stop counting the ticks of clock 10. Processor 7 may store the number of counted ticks that represent the time-of-flight measurement in memory 11. In step 54, at $T_5$ wireless devices 1 then switches from receiver mode to transmitter mode, and wireless device 2 switches from transmitter mode to receiver mode, during which a second switch time elapses ($T_{sw2}$).

In step 55, processor 7 of wireless device 1 instructs oscillator 8 to generate a CW 43 and at $T_6$ transmitter 3 sends CW 43 to receiver 4 of wireless device 2, which begins receiving CW 43 at $T_7$. In step 56, at $T_8$ wireless device 1 switch from transmitter mode to receiver mode, and wireless device 2 switches from receiver mode to transmitter mode, during which a third switch time $T_{sw3}$ elapses. In step 57, receiver 4 measures the frequency and phase of CW 43 with respect to a local phase of oscillator 9 and provides these measurements to processor 14. Processor 14 then instructs oscillator 9 to generate CW 44 based on the measured frequency and phase of CW 43. At $T_9$, transmitter 5 of wireless device 2 sends CW 44 to receiver 5 of wireless device 1, which begins receiving CW 44 at $T_{10}$.

In step 58, wireless device 2 sends the measured phase $\phi_2$ of CW 43 to wireless device 1 by any known method (e.g., Bluetooth, WiFi, wired connection, etc.). In step 59, processor 7 of wireless device 1 calculates the phase shift θ using the measured phase $\phi_1$ of CW 44 and the measured phase $\phi_2$ of CW 43, and may convert the recorded tick count to time. One or both of the phase shift and tick count (or time) may be converted to a distance measurement. In step 60, processor 7 combines the phase shift measurement and the time-of-flight measurement calculated in step 59 by, for example, calculating an average or weighted average of the measurements depending on which of time-of-flight or phase shift should be accorded more weight. The measurements may also be compared and the discarded if not within a chosen range and/or of the same order of magnitude.

Figure 5:
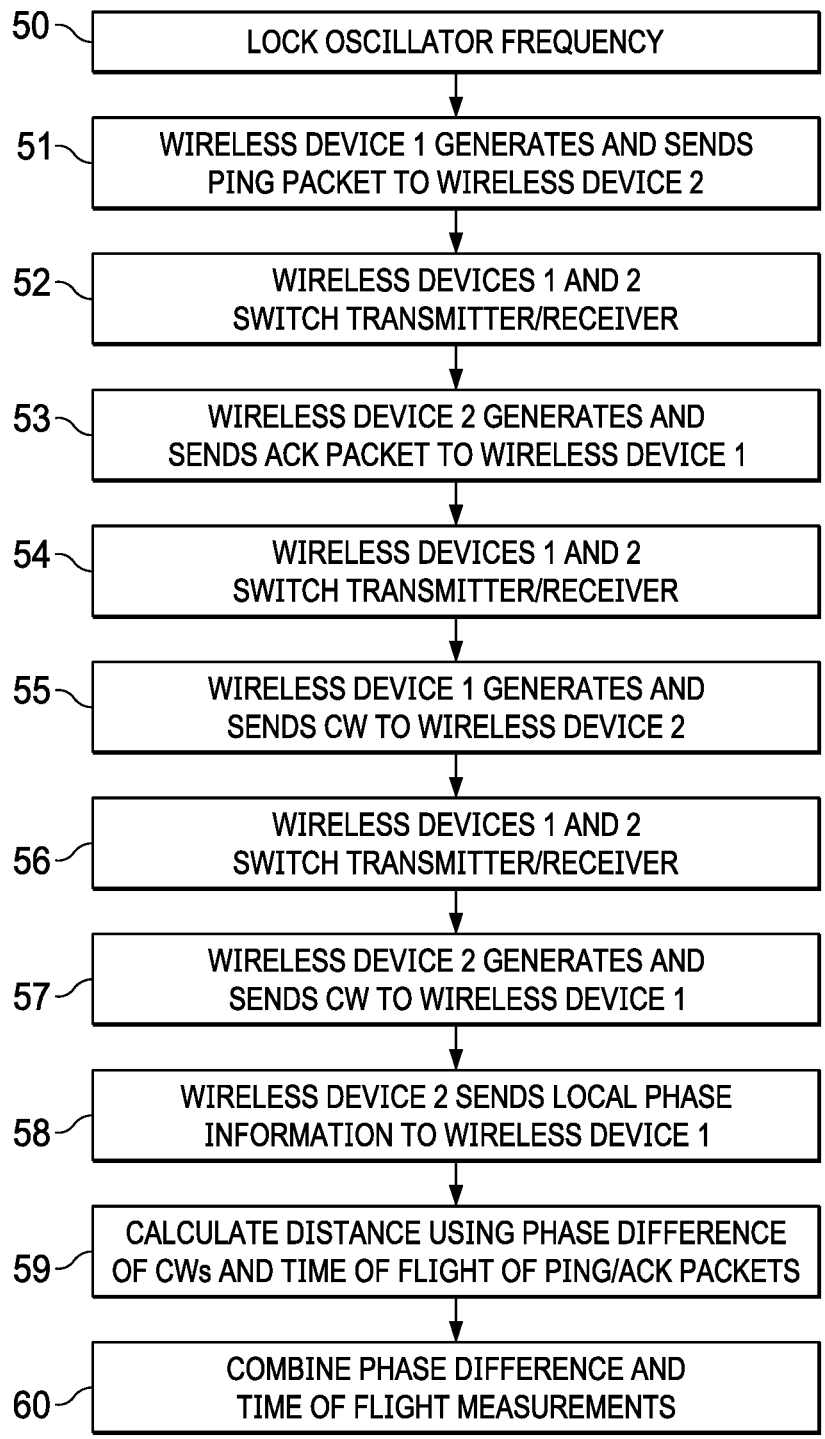
FIG. 5 shows an illustrative method for performing the distance measurement protocol of FIG. 4.

The measurement protocol described in FIGS. 4 and 5 also increases accuracy of measurements by combining phase and time-of-flight measurements. The steps of FIG. 5 may be performed multiple times, and the results averaged, to increase the accuracy of the measurement. Moreover, additional PING/ACK packet exchanges 45 or CW exchanges 46 may be added in any order. For example, three PING/ACK packet 45 exchanges may be performed for each CW exchange 46. In this way, the protocol and method described in FIGS. 4 and 5 provide flexibility to modify the measurement protocol based on the requirements.

Figure 6:
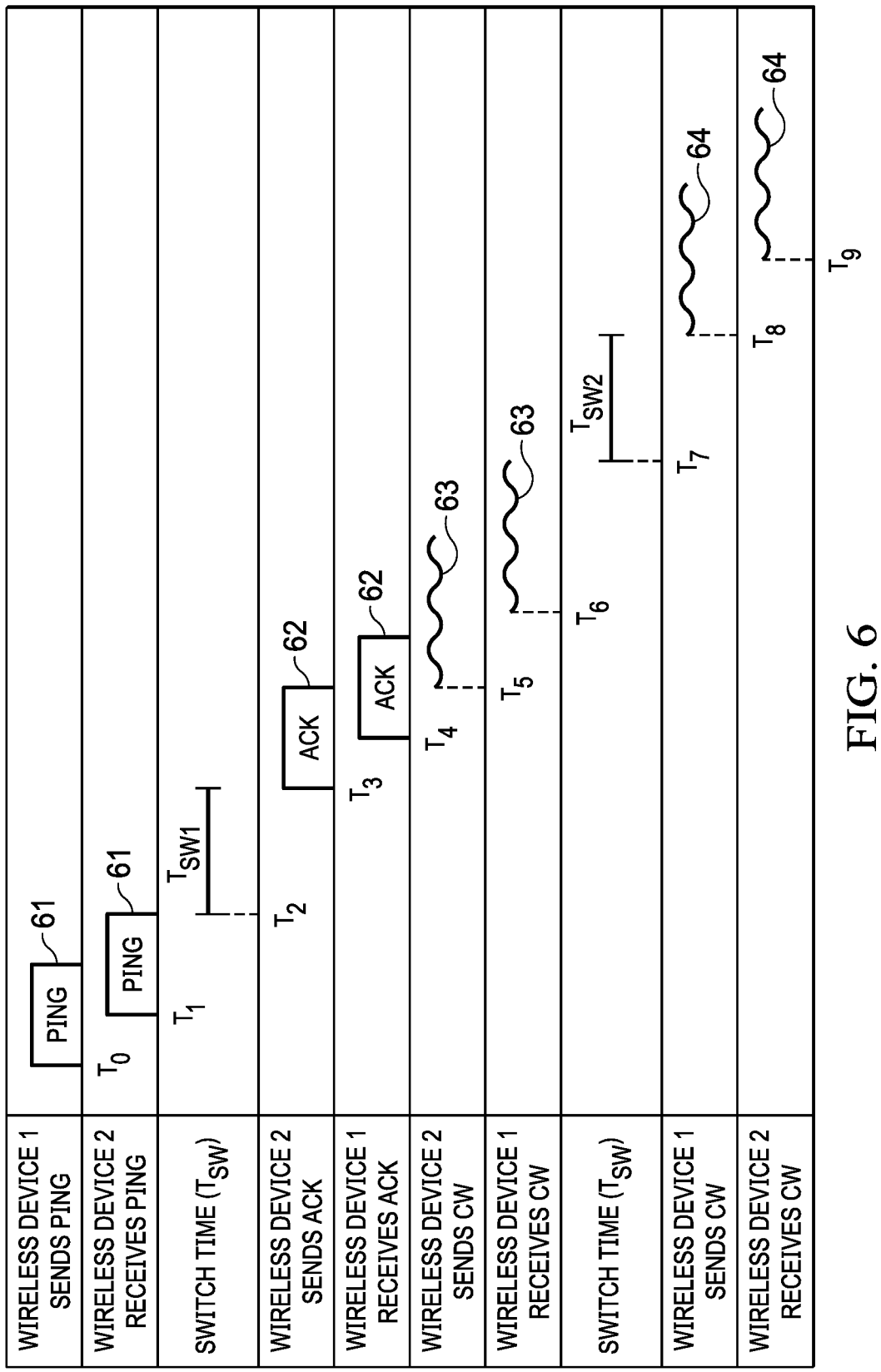
FIG. 6 shows a timing diagram for an illustrative distance measurement protocol.

FIG. 6 shows a timing diagram for another illustrative distance measuring protocol that combines the time-of-flight and phase shift protocols described above, and FIG. 7 shows the steps for performing the measurement protocol. In step 70, wireless devices 1 and 2 may lock the outputs of oscillators 8 and 9, respectively to a desired common frequency. In step 71, wireless device 1 generates a PING packet 61 and at $T_0$ transmitter 3 sends PING packet 61 to wireless device 2. Processor 7 may begin counting ticks from clock 10 at, for example, time $T_0$, and receiver 4 of wireless device 2 begins receiving the PING packet 61 at $T_1$. PING packet 61 may be, for example, a synchronization word packet. Step 70 may alternatively be performed at any point before step 74 below, but step 70 should be timed to allow sufficient time for the oscillators to settle in to the desired frequency before sending a CW. In step 72, at $T_2$ wireless device switches from transmitter mode to receiver mode, and wireless device 2 switches from receiver mode to transmitter mode, during which a first switch time $T_{sw1}$ elapses.

In step 73, processor 14 of wireless device 2 generates an ACK packet 62, which may be a synchronization word packet. At $T_3$ transmitter 6 sends ACK packet 62 to receiver 5 of wireless device 1, which receives ACK packet 62 at $T_8$ causing processor 7 to stop counting the ticks of clock 10. Processor 7 may store the number of counted ticks that represent the time-of-flight measurement in memory 11. In step 74, processor 14 of wireless device 2 instructs oscillator 9 to generate a CW 63 and at $T_5$ transmitter 6 sends CW 63 to receiver 5 of wireless device 1, which begins receiving CW 63 at $T_6$. Although the receiver 5 is shown receiving the ACK packet 62 (at time $T_4$) before the transmitter 6 sends the CW 63 (at time $T_5$), depending on the distance between the transmitter 6 and the receiver 5, time $T_4$ may occur well after time $T_5$ in other examples. In step 75, at $T_7$ wireless device 2 switches from transmitter mode to receiver mode, and wireless device 1 switches from receiver mode to transmitter mode, during which a second switch time $T_{sw2}$ elapses.

In step 76, receiver 5 measures the frequency and phase of CW 63 and provides these measurements to processor 7. Processor 7 then instructs oscillator 8 to generate CW 64 based on the measured frequency and phase of CW 63. At $T_8$, transmitter 3 of wireless device 1 sends CW 64 to receiver 4 of wireless device 2, which begins receiving CW 64 at $T_9$. In step 77, wireless device 2 sends the measured phase $\phi_2$ of CW 64 to wireless device 1 by any known method (e.g., Bluetooth, WiFi, wired connection, etc.). Step 77 may instead occur before step 75 or before step 76. In step 78, processor 7 of wireless device 1 calculates the phase shift θ using the measured phase $\phi_1$ of CW 63 and the measured phase $\phi_2$ of CW 64 received from wireless device 2, and may convert the recorded tick count to time. One or both of the phase shift and tick count (or time) may be converted to a distance measurement. In step 78, processor 7 combines the phase shift measurement and the time-of-flight measurement calculated in step 77 by, for example, calculating an average or weighted average of the measurements depending on which of time-of-flight or phase shift should be accorded more weight. The measurements may also be compared and the discarded if not within a chosen range and/or of the same order of magnitude.

Figure 7:
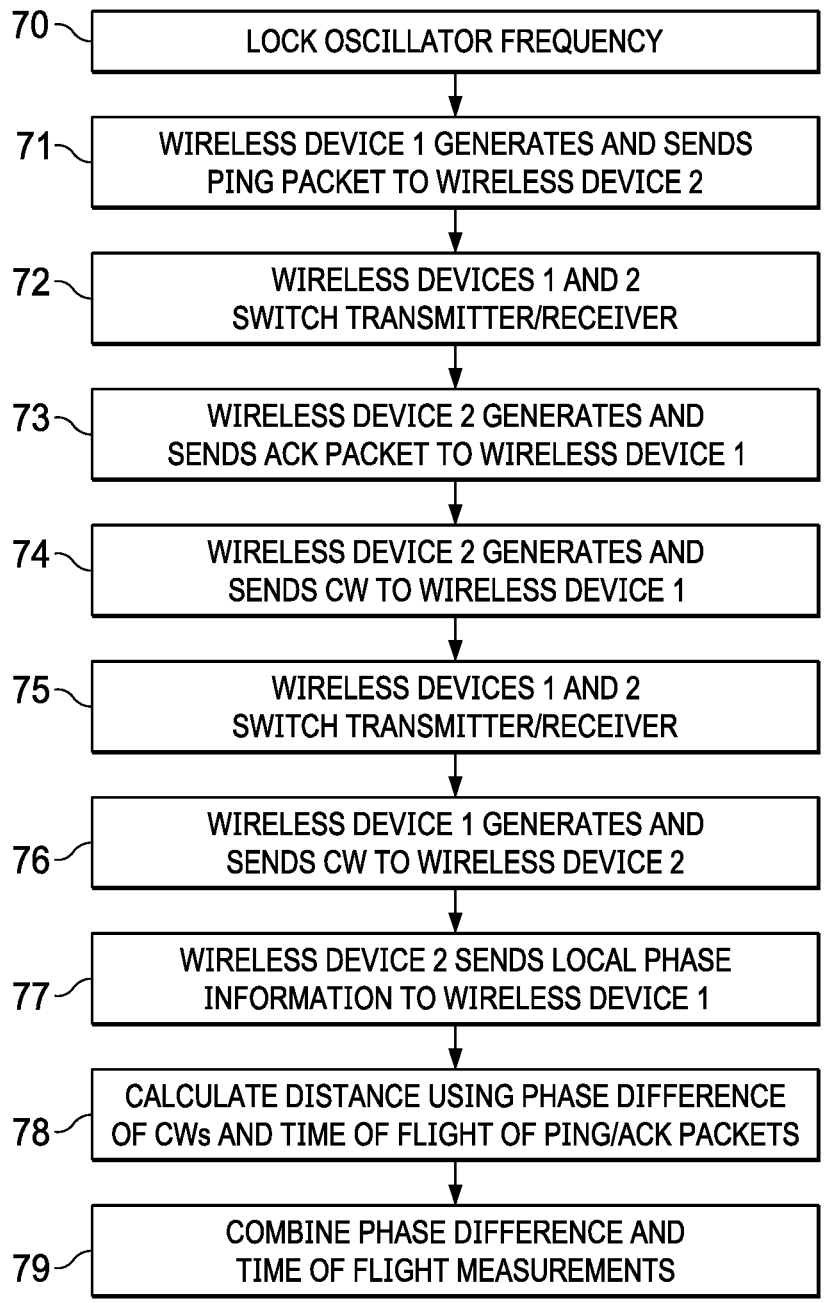
FIG. 7 shows an illustrative method for performing the distance measurement protocol of FIG. 6.

The protocol described in FIGS. 6 and 7 is similar to the protocol described in FIGS. 4 and 5 except that, for example, in the protocol of FIGS. 6 and 7 wireless device 2 sends the first CW (63) of the phase measurement exchange, whereas in the protocol described in FIGS. 4 and 5 wireless device 1 sends the first CW (43) of the phase measurement exchange. Wireless device 2 sending the first CW (63) allows the protocol of FIGS. 6 and 7 to avoid a switch time between steps 73 and 74, thereby further increasing efficiency and reducing power consumption. Like the example protocols of the previous figures, the protocol of FIGS. 6 and 7 also increases accuracy and energy efficiency of measurements by combining phase and time-of-flight measurements to reduce the number of receiver/transmitter switches. The steps of FIG. 7 may be performed multiple times, and the results averaged, to increase the accuracy of the measurement.

The time periods described above in FIGS. 2, 4 and 6 generally occur in the order of the numbered subscript, except as expressly described otherwise herein. For example, T0 generally occurs before T1. In each of the switch times $T_{sw}$, $T_{sw1}$, $T_{sw2}$, $T_{sw3}$ discussed above and shown in FIGS. 2, 4 and 6, wireless devices 1 and 2 may begin the switch simultaneously, or one of the devices may begin to switch before the other. In addition, the wireless device that sent the immediately preceding communication may begin the switch before the other device has completed reception of that communication. $T_{sw}$, $T_{sw1}$, $T_{sw2}$, $T_{sw3}$ each represents a general time period for switching from receiving to transmitter and vice versa, and may all the same, or one or more may be different. The steps described above as being performed by processors 7 and 14 may be performed by executing the executable instructions 13 and 16, respectively.

Modifications are possible in the described embodiments, and other embodiments are possible, within the scope of the claims.

What is claimed is:

1. A method for measuring a distance between a first wireless device and a second wireless device, the method comprising:
    sending a first packet from the first wireless device to the second wireless device;
    receiving, by the first wireless device, a second packet from the second wireless device;
    receiving, by the first wireless device, a first continuous wave signal from the second wireless device, wherein the first continuous wave signal comprises an unmodulated signal having a first phase;
    sending, by the first wireless device, a second continuous wave signal to the second wireless device, wherein the second continuous wave signal comprises an unmodulated signal having a second phase, the second phase based on the first phase;
    receiving, by the first wireless device, an indication of a phase shift based on the second continuous wave signal;
    calculating a first measurement of the distance based on a time between the first wireless device sending the first packet and receiving the second packet;
    calculating a second measurement of the distance based on the indication of the phase shift; and
    determining the distance based on the first measurement and the second measurement.

2. The method of claim 1, further comprising locking a first frequency of a first oscillator in the first wireless device and a second frequency of a second oscillator in the second wireless device before sending the first packet.

3. The method of claim 2, further comprising maintaining the first oscillator at the first frequency and maintaining the second oscillator at the second frequency between sending the first packet and sending the first continuous wave signal.

4. The method of claim 1, wherein the calculating of the first and second measurements is performed by the first wireless device.

5. The method of claim 1, wherein the determining the distance comprises combining the first and second measurements.

6. The method of claim 5, wherein the combining of the first and second measurements comprises averaging the first and second measurements.

7. The method of claim 1, wherein the calculating of the first measurement comprises converting the time to a first distance.

8. The method of claim 1, wherein the first wireless device sends the first packet and receives the second packet before receiving the first continuous wave signal.

9. The method of claim 1, further comprising:
    sending a third packet from the first wireless device to the second wireless device;
    receiving, by the first wireless device, a fourth packet from the second wireless device; and
    calculating a third measurement based on a time between the first wireless device sending the first packet and receiving the second packet.

10. The method of claim 9, further comprising:
    sending a third continuous wave signal from the second wireless device to the first wireless device;
    receiving, by the first wireless device, a fourth continuous wave signal from the second wireless device;
    calculating a fourth measurement based on a phase shift of the third continuous wave signal and the fourth continuous wave signal; and
    calculating a second distance measurement based on the first measurement, second measurement, third measurement and fourth measurement.

11. A method for measuring a distance between a first wireless device and a second wireless device, the method comprising:
    sending a first packet to the first wireless device;
    after the first packet is sent, receiving a second packet from the first wireless device;
    after receiving the second packet, receiving a first continuous wave signal from the first wireless device, wherein the first continuous wave signal comprises an unmodulated signal having a first phase;
    after receiving the first continuous wave signal, sending a second continuous wave signal to the first wireless device, wherein the second continuous wave signal comprises an unmodulated signal having a second phase, the second phase based on the first phase;
    receiving, from the first wireless device, an indication of a phase shift based on the second continuous wave signal;
    calculating a first measurement of the distance based on a time between sending the first packet and receiving the second packet;
    calculating a second measurement of the distance based on the indication of the phase shift; and
    determining the distance based on the first measurement and the second measurement.

12. The method of claim 11, wherein the calculating of the first measurement comprises converting the time to first distance.

13. The method of claim 11, further comprising locking a first frequency of a first oscillator in the first wireless device and a second frequency of a second oscillator in the second wireless device before sending the first packet.

14. The method of claim 13, further comprising maintaining the first oscillator at the first frequency and maintaining the second oscillator at the second frequency between sending the first packet and sending the first continuous wave signal.

15. The method of claim 11, wherein the calculating of the first and second measurements is performed by the first wireless device.

16. The method of claim 11, wherein the determining the distance comprises combining the first and second measurements.

17. A system for measuring a value indicative of distance, the system comprising:
   a first wireless device configured to send a first packet; and
   a second wireless device configured to receive the first packet and then to send to the first wireless device a second packet and then a first continuous wave signal,
   wherein the first continuous wave signal comprises an unmodulated signal having a first phase,
   wherein the first wireless device is further configured, upon receiving the first continuous wave signal, to send to the second wireless device a second continuous wave signal, wherein the second continuous wave signal comprises an unmodulated signal having a second phase, the second phase based on the first phase, and wherein the first wireless device is further configured to:
   receive an indication of a phase shift based on the second continuous wave signal;
   calculate a first measurement based on a time difference between sending of the first packet and receiving the second packet;
   calculate a second measurement based on the indication of the phase shift; and
   determine a distance between the first wireless device and the second wireless device based on the first measurement and the second measurement.

18. The system of claim 17, wherein the first wireless device comprises a first oscillator configured to generate the second continuous wave signal and the second wireless device comprises a second oscillator configured to generate the first continuous wave signal, wherein the first and second oscillators are configured to maintain first and second frequencies, respectively, in the time between sending the first packet and sending the first continuous wave signal.

19. The system of claim 17, wherein the second wireless device is a keyfob.

20. The system of claim 17, wherein first wireless is an automobile.

* * * * *